United States Patent [19]
Sato

[11] 3,836,165
[45] Sept. 17, 1974

[54] WHEEL LIFT DEVICE IN A PALLET TRANSPORTING FORK-LIFT CART

[76] Inventor: Masataro Sato, No. 28-26 Fukuokamachi 2-chome, Takamatsu, Japan

[22] Filed: Jan. 3, 1973

[21] Appl. No.: 320,740

[30] Foreign Application Priority Data
Mar. 7, 1972 Japan.............................. 47-27653

[52] U.S. Cl............................. 280/43.12, 254/2 R
[51] Int. Cl.............................................. B62d 6/12
[58] Field of Search........... 280/43.12; 254/2 R, 2 C

[56] References Cited
UNITED STATES PATENTS
3,249,170  5/1966  Quayle........................... 254/2 C X
3,441,287  4/1969  Leonard et al. ................. 280/43.12

FOREIGN PATENTS OR APPLICATIONS
995,647  6/1965  Great Britain.................. 280/43.12

Primary Examiner—David Schonberg
Assistant Examiner—Michael J. Forman
Attorney, Agent, or Firm—Browdy and Neimark

[57] ABSTRACT

A pallet transporting fork-life cart is disclosed with an improved wheel lift device attached to the front of the fork. A forwardly curved wheel crank, rotatably connected to the front of the fork and responsive to the hydraulic lift mechanism, holds the forward lift wheel at a portion forward of the front of the fork. A pinched portion on the wheel crank permits the pallet being transported to be positioned directly behind and contacting a previously placed pallet regardless of whether single-or-double plane pallets are being used.

2 Claims, 11 Drawing Figures

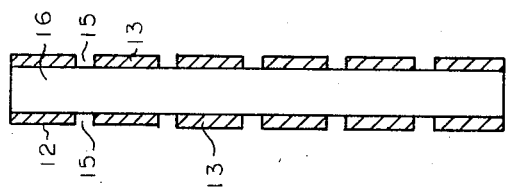
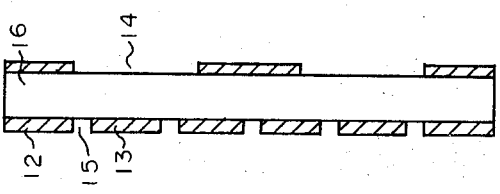
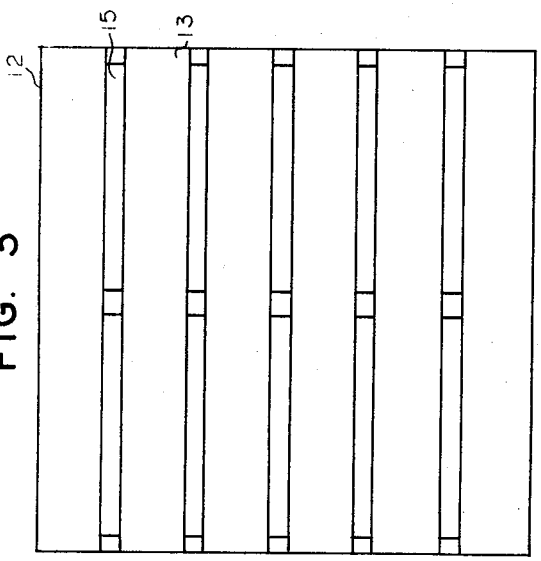
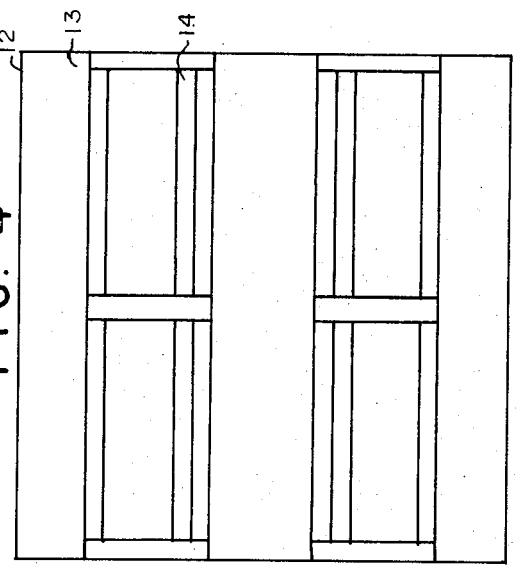
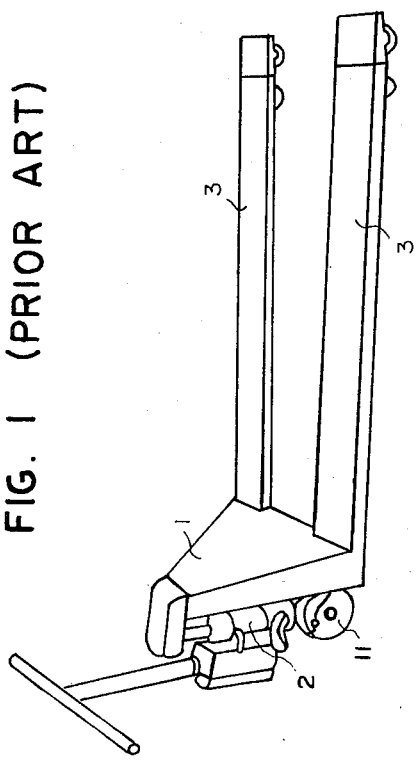
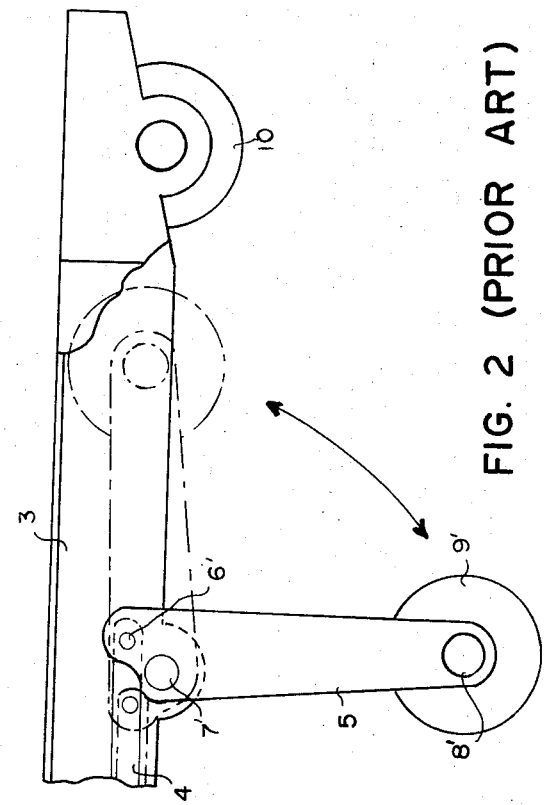

WHEEL LIFT DEVICE IN A PALLET TRANSPORTING FORK-LIFT CART

FIELD OF THE INVENTION

The present invention relates to a wheel device adapted to be attached to the ends of forks of a motor or hand-operated fork-lift cart for transporting a loaded pallet and is intended to facilitate the transporting operation and to provide an economical positioning device for the pallets.

BACKGROUND OF THE INVENTION

There are two types of pallets in freight pallets, one being designed to use only one surface for loading and the other being designed to have both surfaces adapted for loading. The loading surface of a single-plane pallet is flat in the arrangement of plates but the slats are widely separated on the other surface. A double-plane pallet is flat in the arrangement of plates on both surfaces. The single-plane pallet, when stacked on another pallet loaded with bags and other articles having many undulations on the surface, has a possibility of the uneven surface biting into the articles, thereby damaging the articles and of the pallets being inclined, and accordingly it often happens that multistack loading such as laying another loaded pallet over a loaded pallet becomes impossible. In this regard the double-plane pallet is stabilized and permits the use of either surface, with the result that the double-plane pallet is simple to handle. The double-plane pallet has one disadvantage, which is a disadvantage derived from the kind of a pallet transporting machine normally used.

When a fork-lift is used in which travelling and fork lift are performed by power and the fork park includes no wheel and has nothing to do with travelling, the pallets can be arranged so as to come in contact with each other longitudinally as well as laterally after the pallets have been transported to a specified position. This is possible irrespective of whether one-plane pallets or double-plane ones are being used by limiting the length of the fork which is inserted into the pallet. On the other hand, in the case of a hand-operated pallet transporting fork-life cart travelling on wheels secured to the forks, with manual operation, it is necessary to raise and lower the wheels at the ends of the forks when loading and unloading the pallets. If the pallet used is a single-plane pallet, said up and down movement of the wheel is made in the large space portion of the unevenly spaced surface of the pallet, and loading and unloading of the pallet can be carried out without projecting the fork end beyond the front edge of the pallet, so that the pallets can be arranged close to each other longitudinally as well as laterally, in the same manner as a fork lift truck, when transported and arranged. In the case of a double-plane pallet, however, it is necessary to project the fork end beyond the front edge of the pallet to such an extent as will allow the up and down movement of the wheel. Accordingly, when the pallet is transported and arranged laterally no trouble occurs, but when it is transported and arranged longitudinally, the pallet has to be arranged at a space corresponding to the extent of the fork projecting beyond the pallet. This space, even though small individually, is a very important problem that cannot be ignored in a warehouse limited in storage area, as it amounts to a large area when a plurality of pallets have been arranged.

SUMMARY OF THE INVENTION

It is therefore an object of the present invention to overcome the deficiencies of the prior art, such as indicated above.

It is another object of the present invention to provide an improved pallet transporting fork-lift cart.

It is still another object of the present invention to provide a pallet transporting fork-lift cart which makes it possible to closely arrange a double-plane pallet longitudinally in the same manner as in the case of a single-plane pallet.

These and other objects will become more clear when reference is had to the following description of a preferred embodiment and the drawings in which:

BRIEF DESCRIPTION OF THE DRAWINGS

FIG. 1 is a perspective view of a hand-operated pallet transporting forklift cart fork-lift which a prior art type wheel lift device is used;

FIG. 2 is a sectional view of the end portion of a fork showing how the prior art type wheel lift device works;

FIG. 3 is a front view of a single-plane and a double-plane pallet;

FIG. 4 is a rear view of a single-plane pallet;

FIG. 5 is a longitudinal sectional view of the single-plane pallet;

FIG. 6 is a longitudinal sectional view of the double-plane pallet;

DESCRIPTION OF A PREFERRED EMBODIMENT

Figure 7:
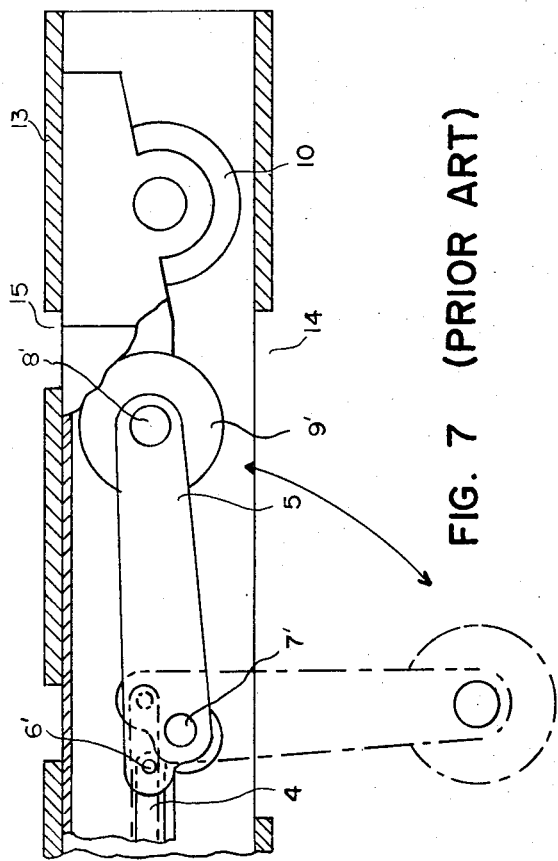
FIG. 7 is a sectional view showing how the prior art type wheel lift device at the end of the fork inserted into the single-plane pallet works.
Figure 9:
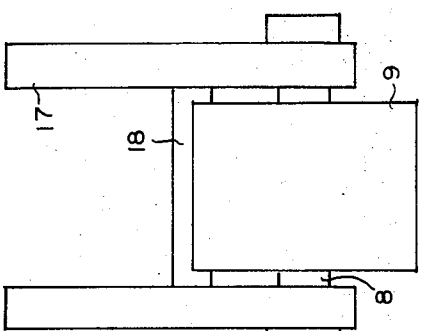
FIG. 9 is a front view of the wheel crank and wheel in FIG. 8.
Figure 8:
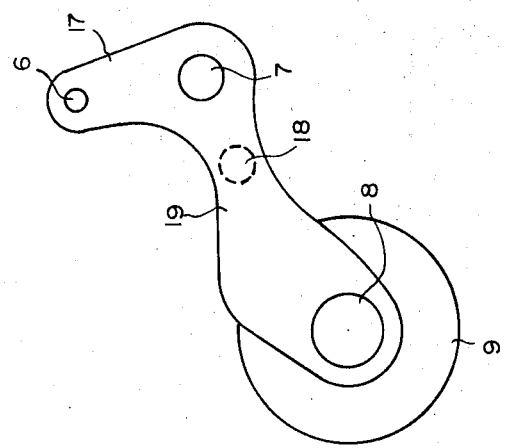
FIG. 8 shows side views of the wheel crank and wheel provided by the present device.

Prior art hand-operated pallet transporting forklift carts 1, as shown in FIGS. 1, 2 and 7 are provided on the rear part thereof with a rear wheel 11 and a hydraulic device 2, and are provided projectingly on the front lower part with forks 3 each of an inverted U-shaped cross section. The forks each have a linear wheel crank 5 rotatably connected by a crank mounting shaft 7' to the inside surface of the ends of the forks. The linear wheel crank 5 is rotatably connected by a driving shaft 6' provided obliquely upwardly and forwardly of said mounting shaft 7' to the end of a hydraulically working rod 4 extending through the inside of the forks and connected to the hydraulic device 2. The crank 5 has a lift wheel 9' rotatably connected to the end of the crank 5 by a wheel mounting shaft 8'. The hydraulically working rod 4 is designed to reciprocate by the actuation of the hydraulic device 2. The wheel crank 5 is moved, with the crank mounting shaft 7' as the center of rotation, in the direction of the arrow shown in FIGS. 2 and 7, in response to the movement of the hydraulically working rod 4, and is brought into the state in which the wheel crank 5 is either received into the fork 3 as shown in phantom in FIG. 2 or projects downward as depicted by the solid lines of FIG. 2. As the hydraulic device 2 is designed to move the whole of the forks 3 up and down simultaneously with the motion of wheel crank 5, the forks 3 always keep a horizontal position. When the wheel crank 5 is received into the fork 3 and placed in a horizontal position, however, it lacks the strength with which to keep the position of the lift wheel 9' free to rotate while holding the fork 3 and the freight, and consequently an auxiliary wheel 10 is attached to the end of the fork 3 so as to hold the fork 3 and the freight thereon in cooperation with the rear wheel 11.

Since the device is of the construction described above, when the fork 3 is inserted into the fork insertion space 16 of a pallet 12 as shown in FIG. 7, all that is necessary to do is to level the wheel crank 5. When the pallet 12 is lifted and transported by the forks 3, all that need be done is to project the wheel crank 5 downward. This lift and fall movement is capable in the uneven spaces 14 but not in the close spaces 15. Accordingly, in the case of a double-plane pallet, both surfaces of which are made up of the plane plates 13 and close spaces 15, the fork 3 portion ahead of at least the crank mounting shaft 7' must be projected beyond the pallet 12, and because of this projection, the front edge of the pallet 12 transported cannot be arranged close to the rear edge of the next pallet 12 fixed previously.

In the device of the present invention, in view of the fact that there is a portion of contact with a level difference between the fork insertion space 16 of the pallet 12 held by the forks 3 and the fork insertion space 16 of the other pallet 12 fixed previously, it was conceived to remove the aforestated disadvantage by curving the wheel crank 17 and forming a space difference pinched body 19 in the middle of the crank 17. Namely, in the device as shown in FIGS. 8 through 11, two wheel cranks 17 arranged in parallel are rotatably connected by a crank mounting shaft 7 to the lower edge of the fork 3. 3. The part of the wheel crank 17 over said crank mounting shaft 7 is rotatably connected by the driving shaft 6 to the hydraulically working rod 4. The part of the wheel crank 17 below the crank mounting shaft 7 is curved forwardly, and the lift wheel 9 is rotatably connected by a wheel mounting shaft 8 to the front end between the wheel cranks 17. The lift wheel 9 is projected ahead of the end of the fork 3 and a space difference pinched body 19 is formed between said lift wheel 9 and said crank mounting shaft 7. The space difference pinched body 19 has a width adapted for a portion of contact with the level difference between the fork insertion space 16 of the pallet 12 held by the forks 3 and the fork insertion space 16 of the pallet 12 fixed previously. A reinforcing shaft 18 is fixed between the lift wheel 9 and crank mounting shaft 7 to supplement the strength of the portions 9 and 7.

Figure 10:
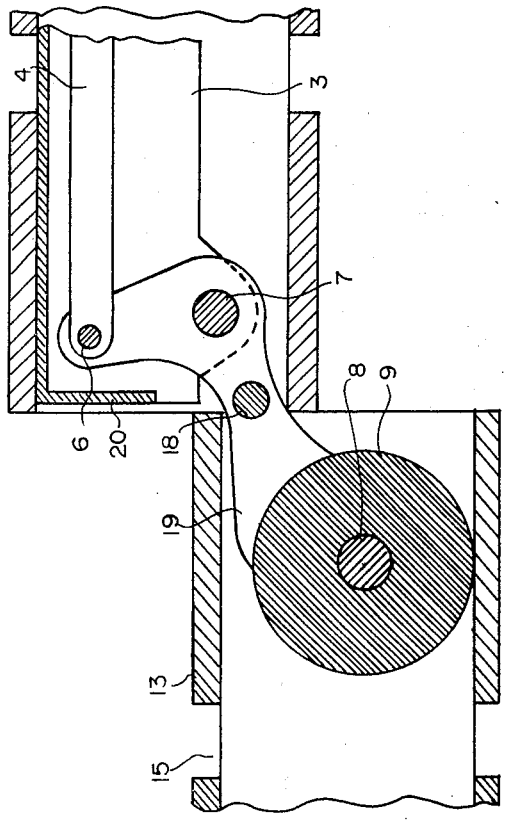
FIG. 10 is a sectional view showing how the lift-wheel of the wheel lift device of the present invention mounted in the fork and during transportation of the double-plane pallet intrudes into the fork insertion space of the other stationary pallet.
Figure 11:
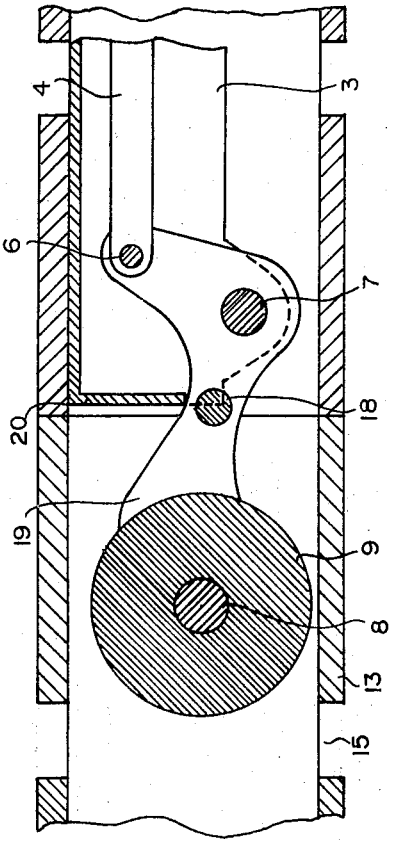
FIG. 11 is a sectional view showing how two double-plane pallets are connected and placed stationary by the actuation of the wheel lift device of the invention.

Since the device of the present invention is constructed in the manner as described above, there is no fear of the wheel cranks 17 preventing the front edge of the pallet 12 held by the forks from being brought into contact with the rear edge of the pallet 12 placed stationary, as the lift wheel 9 is inserted into the fork insertion space 16 of the other stationary pallet 12 in the state in which the hydraulically working rod 4 is moved forward and the wheel cranks 17 are projected downward and the pallet 12 is held on the forks 3, as shown in FIG. 10. Accordingly, when the hydraulically working rod 4 is moved backward to bring the wheel cranks 17 into a horizontal position, the forks 3 can be readily drawn out from the fork insertion space 16 with the held pallet 12 and the stationary pallet 12 still contacting each other, as shown in FIG. 11. A crank holding edge 20 is formed on the front edge of the end of the fork and hangs down in such a manner that it bears upon the upper edge of the space difference pinched body 19 of the wheel crank 7 when the crank is in its horizontal position. Accordingly, the lift wheel 9 together with the rear wheel 11 can sufficiently the the weight of the forks 3 and the freight.

As described above, the device of the present invention is highly effective for increasing the value of the hand-operated pallet transporting fork cart 1 through advantages such as the simple operation which makes it only necessary for the operator to insert the forks 3 into the space 16 of the pallet 12 until the lift wheel 9 projects beyond the fork insertion space 16, regardless of the position of the uneven space 14. With the prior art wheel crank 5 careful attention had to be paid to the positioning of the wheel 9' in the uneven space 14. Furthermore, the present device may be used irrespective of whether the pallet is provided with close spaces 15 alone or uneven spaces 14 also. The feasibility of enlarging the scope of use of pallets by hand-operated pallet transporting fork carts is thus established.

It will be obvious to those skilled in the art that various changes may be made without departing from the spirit of the invention, and therefore the invention is not limited to what is shown in the drawings and described in the specification but only as indicated in the appended claims.

What is claimed is:

1. In a pallet transporting fork-lift cart comprising a forked element, hydraulic means connected to the rear of said forked element for lifting and lowering said forked element, wheel means connected to said hydraulic means for moveably supporting said hydraulic means and the rear of said forked element, and wheel lift means, connected to the front of said forked element and operably to said hydraulic means by a rod, for moveably supporting the front of said forked element at both the lifted and lowered positions thereof, the improvement wherein said wheel lift means comprises:

a lift wheel;
a wheel crank with two ends, rotatably connected between said ends to the front end of said forked element, wherein one of said ends is rotatably connected to said rod and the other of said ends is rotatably connected to said lift wheel;
said wheel crank being shaped such that said entire lift wheel extends beyond the front end of said fork element in both said lifted and lowered position; and
wherein the part of said wheel crank between the connection thereof to said forked element and the connection thereof to said lift wheel has a pinched portion of a sufficiently narrow width to allow said lift wheel, when transporting a pallet in the lifted position, to enter a pallet previously positioned to such an extent that the pallet being transported comes into contact therewith and said pinched portion fits between the bottom of the pallet being transported and the top of the previously positioned pallet.

2. A fork-lift cart in accordance with claim 1 wherein the front of said forked element includes a stop means thereon for contacting said wheel crank when said forked element is in said lowered position to permit said lift wheel to support said forked element in said lowered position.

* * * * *